US012730400B2

(12) United States Patent
Kanematsu

(10) Patent No.: US 12,730,400 B2
(45) Date of Patent: Sep. 8, 2026

(54) PRINTING SYSTEM, STATIC ELIMINATION APPARATUS, METHOD FOR CONTROLLING PRINTING SYSTEM, AND STORAGE MEDIUM

(71) Applicant: CANON KABUSHIKI KAISHA, Tokyo (JP)

(72) Inventor: Shinichi Kanematsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 19/025,770

(22) Filed: Jan. 16, 2025

(65) Prior Publication Data

US 2025/0237980 A1 Jul. 24, 2025

(30) Foreign Application Priority Data

Jan. 22, 2024 (JP) ................................. 2024-007323

(51) Int. Cl.
*G03G 15/00* (2006.01)

(52) U.S. Cl.
CPC ..... *G03G 15/5004* (2013.01); *G03G 15/6573* (2013.01); *G03G 2215/00535* (2013.01)

(58) Field of Classification Search
CPC ..................... G03G 21/00; G03G 2215/00417
See application file for complete search history.

(56) References Cited

U.S. PATENT DOCUMENTS

2015/0168878 A1 6/2015 Imaizumi et al.
2021/0216031 A1* 7/2021 Tanaka ............... G03G 15/6535

FOREIGN PATENT DOCUMENTS

JP 6271986 B2 1/2018

* cited by examiner

*Primary Examiner* — Walter L Lindsay, Jr.
*Assistant Examiner* — Andrew V Do
(74) *Attorney, Agent, or Firm* — Canon U.S.A., Inc. IP Division

(57) ABSTRACT

A method for controlling a printing system including a printing apparatus configured to execute a printing process on a sheet, and a static elimination apparatus configured to perform a static elimination process on the sheet printed by the printing apparatus, includes switching, depending on a printing surface of the sheet printed by the printing apparatus, a polarity of a voltage to be applied to a first static elimination unit provided on an upper surface side of the sheet printed by the printing apparatus to positive or negative, and switching, depending on the printing surface of the sheet printed by the printing apparatus, a polarity of a voltage to be applied to a second static elimination unit provided on a lower surface side of the sheet printed by the printing apparatus to positive or negative.

9 Claims, 11 Drawing Sheets

PRINTING SYSTEM, STATIC ELIMINATION APPARATUS, METHOD FOR CONTROLLING PRINTING SYSTEM, AND STORAGE MEDIUM

BACKGROUND

Field of the Disclosure

The present disclosure relates to a printing system, a static elimination apparatus, a method for controlling a printing system and a static elimination apparatus, and a storage medium.

Description of the Related Art

A recording medium (hereinafter referred to as a "sheet") used in printing work is conveyed in the state where the sheet is charged with static due to residual charges in the process of an electrophotographic process or slight friction with a conveyance roller or a guide that occurs while the sheet is conveyed. Then, sheets may stick together due to this static. Moreover, the attachment of dust or paper dust to a final product may cause a decrease in the quality of the final product due to this static.

Sheets come in types such as plain paper, thick paper, synthetic paper, and coated paper. In the case of the plain paper, the electrical resistance of the sheet is low, and charges are likely to move in the paper. Thus, the amount of charge of the plain paper is small, and the state where the plain paper is charged with static is released fast. On the other hand, in the case of a sheet using a synthetic resin (a plastic), such as thick paper, synthetic paper, or coated paper (hereinafter referred to as a "special sheet"), the electrical resistance of the sheet is high, and charges are less likely to move in the paper. Thus, as a result, there is a tendency that a sheet such as synthetic paper or coated paper is likely to be charged, and charges are likely to remain in the sheet. It is generally known that a sheet is likely to be influenced by an environment, particularly humidity, and the lower the humidity of the environment is, the more likely to be charged with static the sheet is, under the influence of a decrease in the amount of discharge in the air.

If post-processing is performed in the state where sheets stick together, this influences the process of aligning the sheets. Thus, not only may the quality of the post-processing remarkably decrease, but also a jam (paper jam) may be caused due to a sheet feeding failure or a conveyance failure when the post-processing is performed. This can damage the sheets or a device.

Thus, to prevent such a risk from occurring, it is desirable to eliminate static from the sheets after a printing step before the post-processing is performed. Accordingly, a printing apparatus that performs a so-called static elimination process for canceling out charges charged in a sheet by providing a static elimination member downstream in the conveyance direction of the sheet and applying a voltage to the static elimination member is discussed (see the publication of Japanese Patent No. 6271986).

There is also a printing apparatus that performs a static elimination process on a sheet by applying a voltage to a conveyance roller located downstream of a fixing device.

In a static elimination process using a configuration in which a voltage is applied to a static elimination member or a conveyance roller as described above (hereinafter referred to as "static elimination rollers"), charges opposite to charges charged in a sheet are applied to the sheet via the static elimination rollers, thereby canceling out charged static. For example, it is possible to achieve static elimination by a method for applying charges having a polarity opposite to that of a conveyed sheet after a printing step to an upper side (a face-up (hereinafter referred to as "UP") side) of the sheet. In the sheet after the printing step, a surface on which the printing is performed by transferring toner is remarkably charged. Thus, a conventional technique is configured to eliminate static by conveying a sheet face up according to static elimination rollers when static is eliminated. However, in a special sheet such as synthetic paper or coated paper having a great resistance value, charges are less likely to pass from an UP side to a lower side (a face-down (hereinafter referred to as "FD") side) of the sheet. Thus, a sufficient static elimination effect may not be obtained by applying a static elimination voltage from one side. In the state where a sheet is charged because static is not appropriately eliminated as described above, there is a case where a final product having a quality intended by a user is not obtained because the sticking of sheets occurs and makes post-processing difficult, or the quality of a final product remarkably deteriorates due to the attachment of dust or paper dust.

SUMMARY

According to an aspect of the present disclosure, a printing system includes a printing apparatus configured to execute a printing process on a sheet, and a static elimination apparatus configured to perform a static elimination process on the sheet printed by the printing apparatus, wherein the static elimination apparatus includes a first static elimination unit provided on an upper surface side of the sheet printed by the printing apparatus, and a second static elimination unit provided on a lower surface side of the sheet, the static elimination apparatus being configured to switch a polarity of a voltage to be applied to the first static elimination unit to positive or negative and configured to switch a polarity of a voltage to be applied to the second static elimination unit to positive or negative, and wherein the static elimination apparatus includes a control unit configured to perform control to, depending on a printing surface of the sheet printed by the printing apparatus, switch the polarity of the voltage to be applied to the first static elimination unit to positive or negative and switch the polarity of the voltage to be applied to the second static elimination unit to positive or negative.

Further features of various embodiments will become apparent from the following description of exemplary embodiments with reference to the attached drawings.

DESCRIPTION OF THE EMBODIMENTS

With reference to the drawings, exemplary embodiments for carrying out the present disclosure will be described in detail in an illustrative manner below. Components described in the exemplary embodiments, however, are merely illustrative, and are not intended to limit the scope of every embodiment to them only.

Figure 1:
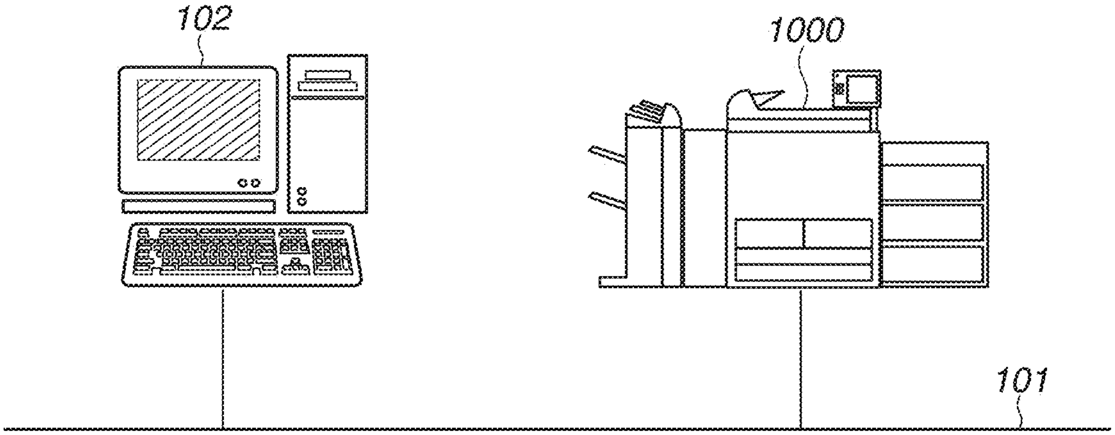
FIG. 1 is a diagram illustrating an example of a configuration of an entire system according an exemplary embodiment.

FIG. 1 is a diagram illustrating an example of the configuration of a system according to an exemplary embodiment of the present disclosure and corresponds to the simplest configuration according to a first exemplary embodiment.

As illustrated in FIG. 1, a system according to the present exemplary embodiment includes a printing system 1000 and a client computer (hereinafter "personal computer (PC)") 102, which are connected to each other via a network 101. The PC 102 can transmit page description language (PDL) code data as a print job to the printing system 1000 via the network 101.

According to a print job from the PC 102, the printing system 1000 performs printing on a recording medium (a sheet).

Figure 2:
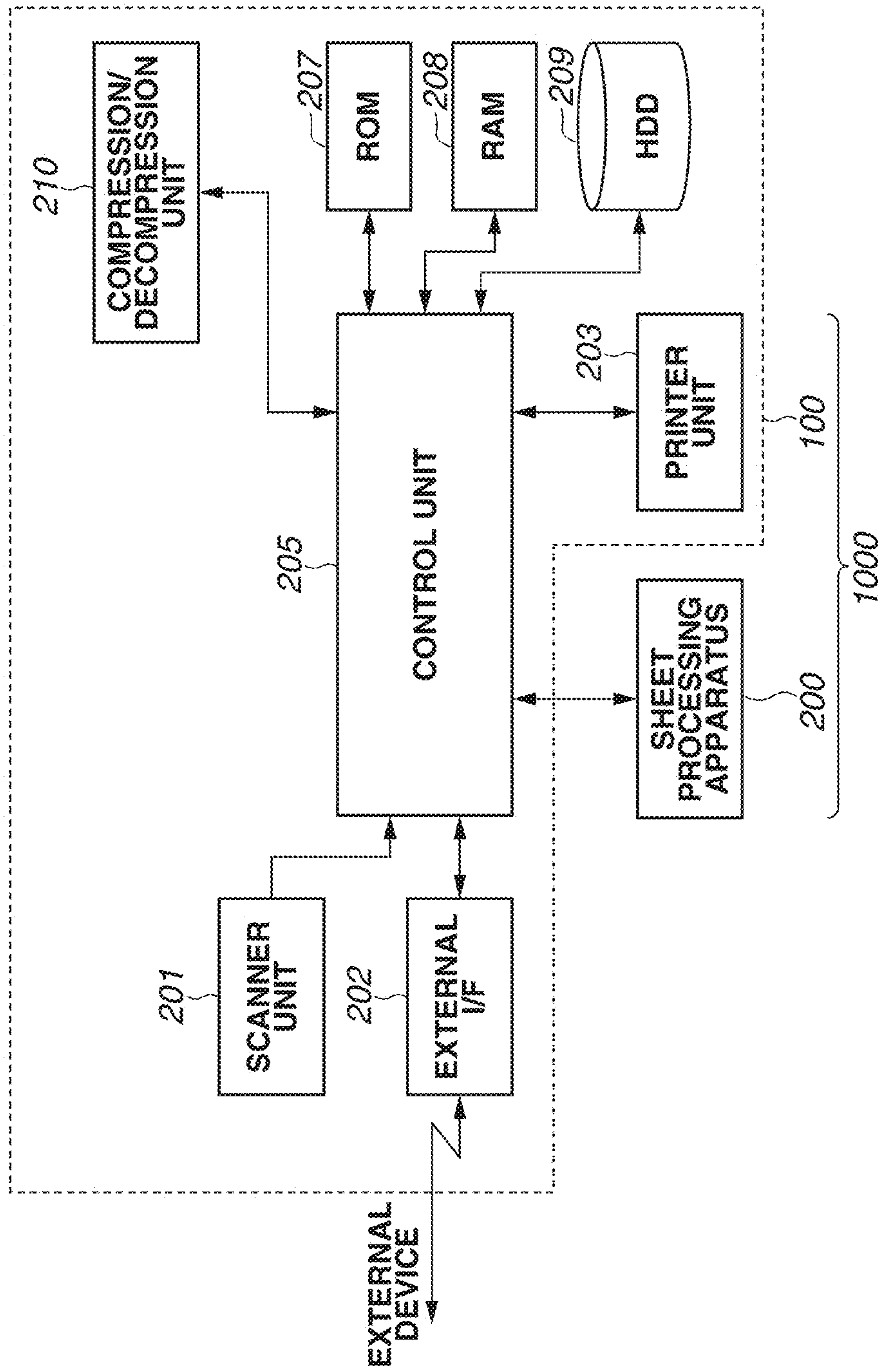
FIG. 2 is a block diagram illustrating an example of a configuration of a printing system according to the present exemplary embodiment.

Next, with reference to a system block diagram in FIG. 2, the printing system 1000 is described.

FIG. 2 is a block diagram illustrating an example of the configuration of the printing system 1000.

As illustrated in FIG. 2, the printing system 1000 includes a printing apparatus 100, which is a portion surrounded by a dotted line in FIG. 2, and a sheet processing apparatus 200. To the printing apparatus 100, any number of sheet processing apparatuses 200 can be connected. The present exemplary embodiment is described taking a multifunction peripheral (MFP) having a plurality of functions such as a copy function and a printer function as an example of the printing apparatus 100. The printing apparatus 100, however, may be a single-function printing apparatus having only a copy function or only a printer function. In the present exemplary embodiment, as an example, the printing system 1000 includes various components described below.

The printing system 1000 is configured so that the sheet processing apparatus 200 connected to the printing apparatus 100 can execute sheet processing on a sheet printed by the printing apparatus 100. The printing system 1000, however, can also include only the printing apparatus 100 without connecting the sheet processing apparatus 200 to the printing apparatus 100. The sheet processing apparatus 200 is configured to communicate with the printing apparatus 100. The sheet processing apparatus 200 can receive an instruction from the printing apparatus 100 and execute sheet processing as described below. Also, the printing system 1000 may be an integrated apparatus in which the functions of the sheet processing apparatus 200 are provided in the printing apparatus 100.

In the printing apparatus 100, a scanner unit 201 reads an image on a document, converts the image into image data, and transfers the image data to another unit. An external interface (I/F) 202 transmits and receives data to and from another apparatus connected to the network 101. A printer unit 203 prints an image based on image data input to the printer unit 203 on a sheet.

Figure 4:
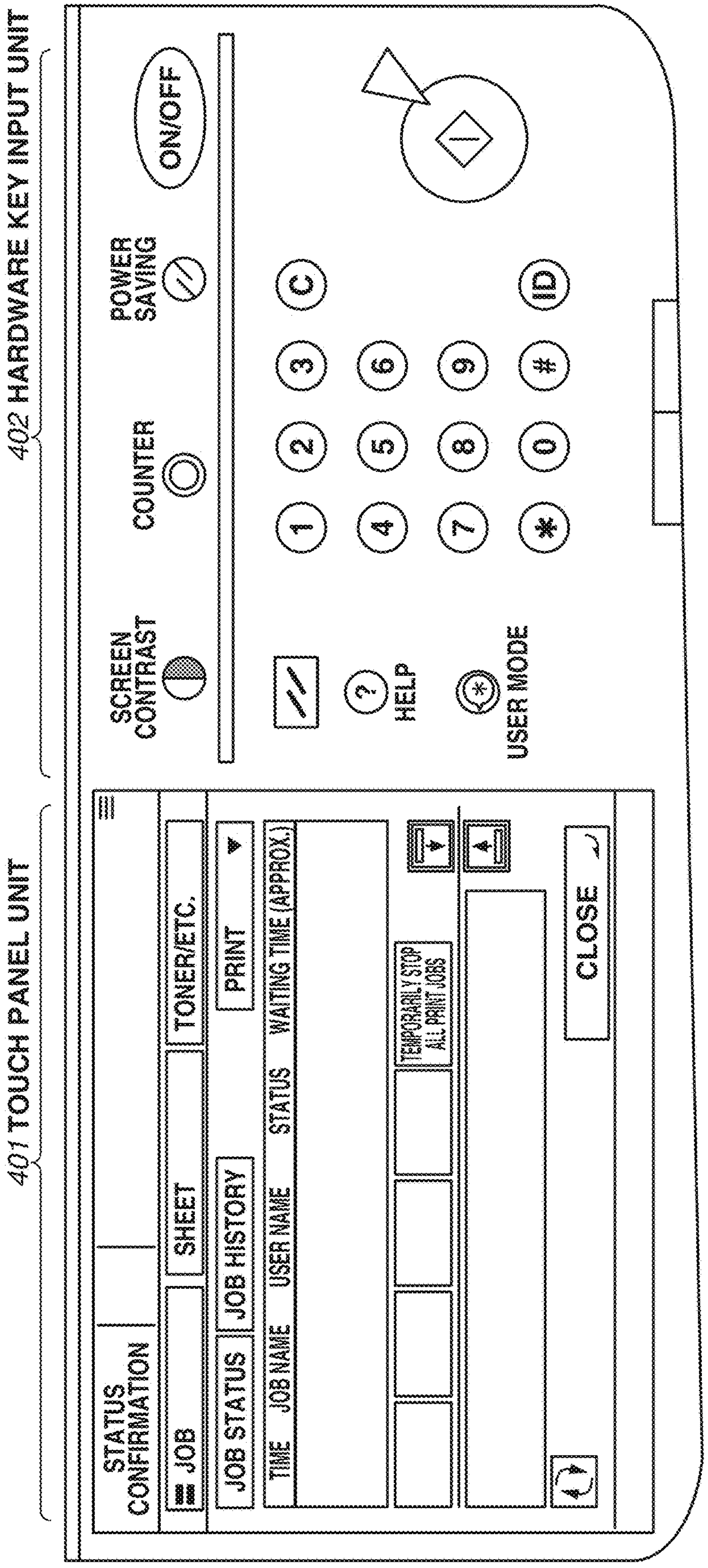
FIG. 4 is a diagram illustrating an example of a configuration of an operation unit included in the printing apparatus according to the present exemplary embodiment.

An operation unit 204 has a configuration as illustrated in FIG. 4.

FIG. 4 is a diagram illustrating an example of the configuration of the operation unit 204 included in the printing apparatus 100.

As illustrated in FIG. 4, the operation unit 204 includes a hardware key input unit 402 and a touch panel unit 401 and receives an instruction from a user through the hardware key input unit 402 and the touch panel unit 401. The operation unit 204 also performs various types of display on the touch panel unit 401 included in the operation unit 204.

A control unit 205 is a central processing unit (CPU) that performs overall control of the processing and the operations of various units included in the printing system 1000. The control unit 205 also controls the operations of the printing apparatus 100 and the sheet processing apparatus 200 connected to the printing apparatus 100.

A read-only memory (ROM) 207 stores various computer programs executed by the control unit 205 and data. For example, the ROM 207 stores a program for causing the control unit 205 to execute various types of processing as illustrated in flowcharts described below and a display control program required to display various settings screens described below. The ROM 207 also stores a program for the control unit 205 to execute the operation of interpreting PDL code data received from the PC 102 and rasterizing the PDL code data into raster image data (image data). Additionally, the ROM 207 also stores a boot sequence, font information, and a threshold for the amount of charge for determining a static elimination effect.

A random-access memory (RAM) 208 stores image data and PDL code data sent from the scanner unit 201 or the external I/F 202, various programs loaded from the ROM 207, and setting information. The RAM 208 also stores information regarding the sheet processing apparatus 200 (information regarding the type and the function of each sheet processing apparatus 200 connected to the printing apparatus 100). The control unit 205 can use the information regarding the sheet processing apparatus 200 that is stored in the RAM 208 for control.

A hard disk drive (HDD) 209 includes a hard disk and a driving unit that reads and writes data from and to the hard disk. The HDD 209 is a large-capacity storage device for storing image data input from the scanner unit 201 and compressed by a compression/decompression unit 210. Based on an instruction from the user, the control unit 205 can cause the printer unit 203 to print image data stored in the HDD 209. The HDD 209 is also used as a spooler, and the control unit 205 can manage PDL code data received from the PC 102 as a print job and store the print job in the HDD 209. The control unit 205 can manage a print job stored in the HDD 209. The control unit 205 can also acquire the number of print jobs stored in the HDD 209 and setting information regarding settings made for each print job. Also, a configuration may be employed in which another storage device such as a solid-state drive (SSD) or an embedded MultiMediaCard (eMMC) is included instead of or in combination with the HDD 209.

Based on various compression methods such as Joint Bi-level Image Experts Group (JBIG) and Joint Photographic Experts Group (JPEG), the compression/decompression unit 210 performs the operation of compressing and decompressing image data stored in the RAM 208 or the HDD 209.

Figure 3:
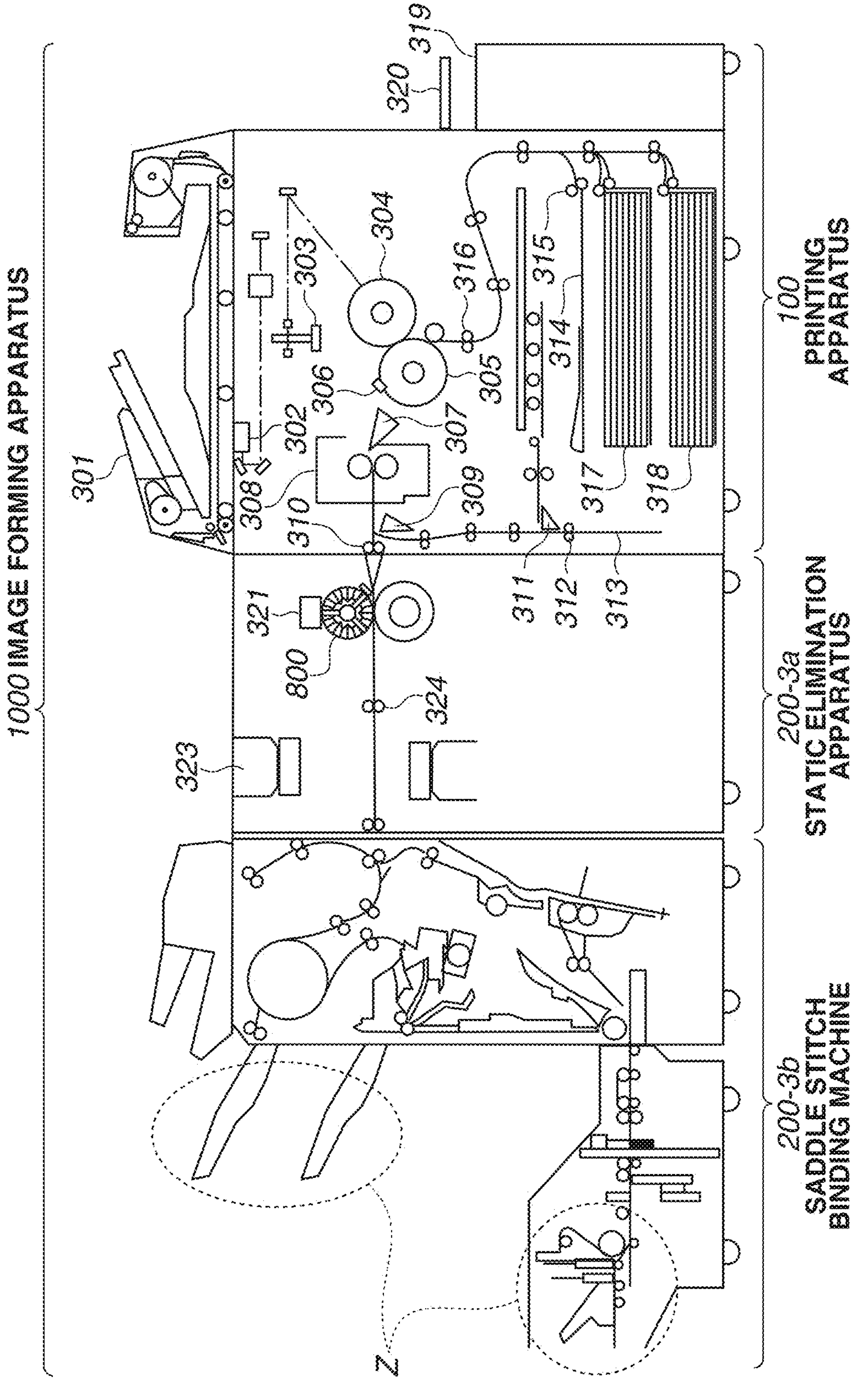
FIG. 3 is a cross-sectional view illustrating an example of configurations of a printing apparatus and a sheet processing apparatus according to the present exemplary embodiment.

Next, with reference to a cross-sectional view in FIG. 3, the configuration of the printing system 1000 is described.

FIG. 3 is a cross-sectional view illustrating an example of configurations of the printing apparatus 100 and the sheet processing apparatus 200 connected to the printing apparatus 100. FIG. 3 illustrates an example of a configuration in which the printing system 1000 includes a static elimination apparatus 200-3*a* and a saddle stitch binding machine 200-3*b* as the sheet processing apparatus 200.

First, the configuration of the printing apparatus 100 is described.

An automatic document feeder (ADF) 301 separates a bundle of documents set on a stacking surface of a document tray in page order from the document on the first page and conveys the document onto document platen glass so that a scanner 302 scans the document.

The scanner 302 reads an image on the document conveyed onto the document platen glass and converts the image into image data using a charge-coupled device (CCD). A rotary polygon mirror (a polygon mirror) 303 makes a light beam such as laser light modulated according to the image data incident and irradiates a photosensitive drum 304 with the laser light as reflected scanning light. A latent image formed on the photosensitive drum 304 by the laser light is developed using toner, and this toner image is transferred to a sheet attached to a transfer drum 305. A series of operations of this image formation process is sequentially executed using toner of yellow (Y), magenta (M), cyan (C), and black (K), thereby forming a full-color image. After the image formation process is performed four times, the sheet on the transfer drum 305 on which the full-color image is formed is separated by a separation claw 306 and conveyed to a fixing device 308 by a pre-fixing conveyance device 307.

The fixing device 308 includes the combination of a roller and a belt and has a heat source such as a halogen heater built-in. The fixing device 308 melts and fixes by heat and pressure the toner on the sheet to which the toner image is transferred. A sheet discharge flapper 309 is configured to swing about a swing shaft and defines the conveyance direction of the sheet conveyed from the fixing device 308. When the sheet discharge flapper 309 swings in the clockwise direction in FIG. 3, the sheet is conveyed straight and discharged to outside the apparatus by sheet discharge rollers 310. By the above sequence, the control unit 205 controls the printing apparatus 100 to execute one-sided printing.

On the other hand, in a case where images are formed on both sides of the sheet, the sheet discharge flapper 309 swings in the counterclockwise direction in FIG. 3. The course of the sheet is changed to the down direction, and the sheet is fed to a two-sided conveyance unit. The two-sided conveyance unit includes a reversal flapper 311, reversal rollers 312, a reversal guide 313, and a two-sided tray 314. The reversal flapper 311 swings about a swing shaft and defines the conveyance direction of the sheet. In a case where the control unit 205 processes a two-sided print job, the control unit 205 performs control to swing the reversal flapper 311 in the counterclockwise direction in FIG. 3, thereby feeding the sheet on the first surface of which printing is completed by the printer unit 203 to the reversal guide 313 via the reversal rollers 312. Then, the control unit 205 performs control to temporarily stop the reversal rollers 312 in the state where the rear end of the sheet is nipped by the reversal rollers 312, and subsequently swing the reversal flapper 311 in the clockwise direction in FIG. 3. The control unit 205 also performs control to rotate the reversal rollers 312 in the opposite direction. Consequently, the control unit 205 performs control to switch back the sheet, convey the sheet, and guide the sheet to the two-sided tray 314 in the state where the rear and front ends of the sheet are switched. The two-sided tray 314 temporarily stacks the sheet, and then, sheet re-feeding rollers 315 feed the sheet to registration rollers 316 again. At this time, the sheet is sent in the state where the opposite surface of the surface subjected to the transfer step of the first side is opposed to the photosensitive drum 304. Then, similarly to the above process, the control unit 205 performs control to form an image of the second side on the second surface of the sheet. Then, the images are formed on both sides of the sheet, and the sheet is subjected to the fixing step and discharged from the inside of the main body of the printing apparatus 100 to outside the apparatus via the sheet discharge rollers 310.

By the above sequence, the control unit 205 controls the printing apparatus 100 to execute two-sided printing.

The printing apparatus 100 also includes sheet feeding units that store sheets required for a printing process. The sheet feeding units include sheet feeding cassettes 317 and 318 (each of which can store 500 sheets, for example), a sheet feeding deck 319 (which can store 5000 sheets, for example), and a manual-bypass tray 320. In the sheet feeding cassettes 317 and 318 and the sheet feeding deck 319, various sheets different in size and material can be set by distinguishing the sheets with respect to each sheet feeding unit. In the manual-bypass tray 320, various sheets including a special sheet such as an overhead projector (OHP) sheet can be set. As to sheet type information regarding various sheets set in the sheet feeding units of the printing apparatus 100, sheet type information can be registered with respect to each sheet feeding unit through the operation unit 204 and stored in the control unit 205. Thus, the control unit 205 is configured to determine the registered sheet type information and on what sheet type of sheet the printing apparatus 100 is currently executing a print process, while the printing apparatus 100 is performing print output.

Next, the static elimination apparatus 200-3*a* is described.

Figure 5:
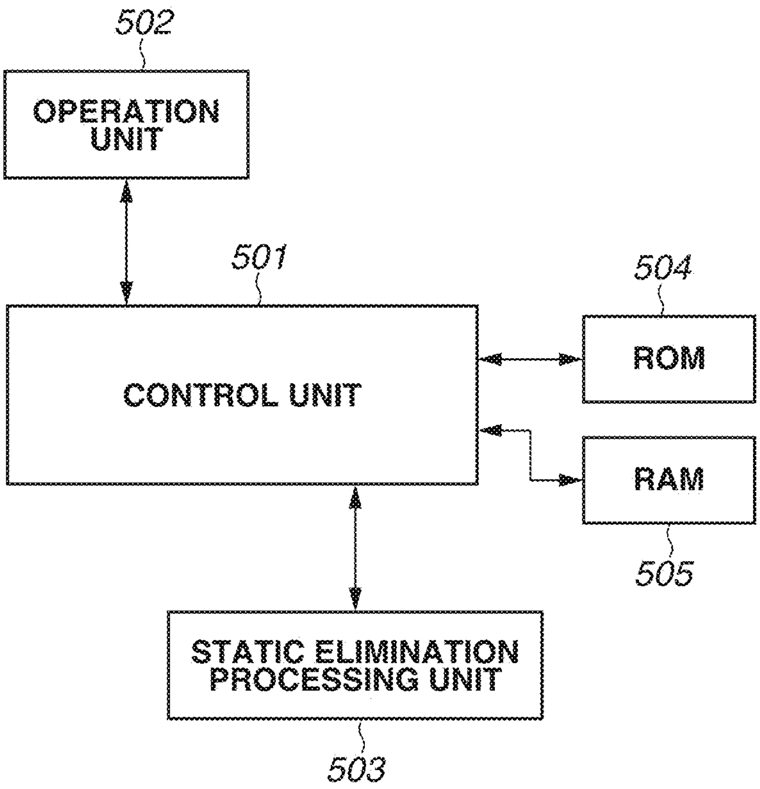
FIG. 5 is a block diagram illustrating an example of a configuration of a static elimination apparatus according to the present exemplary embodiment.

The static elimination apparatus 200-3*a* has a configuration as illustrated in FIG. 5.

FIG. 5 is a block diagram illustrating an example of the configuration of the static elimination apparatus 200-3*a*.

The static elimination apparatus 200-3*a* includes a control unit 501 separately from the printing apparatus 100. The control unit 501 is connected to the printing apparatus 100 via a bus (not illustrated) and performs overall management of the entirety of the static elimination apparatus 200-3*a* while communicating with the control unit 205 of the printing apparatus 100 in FIG. 2 via the bus.

Figure 6:
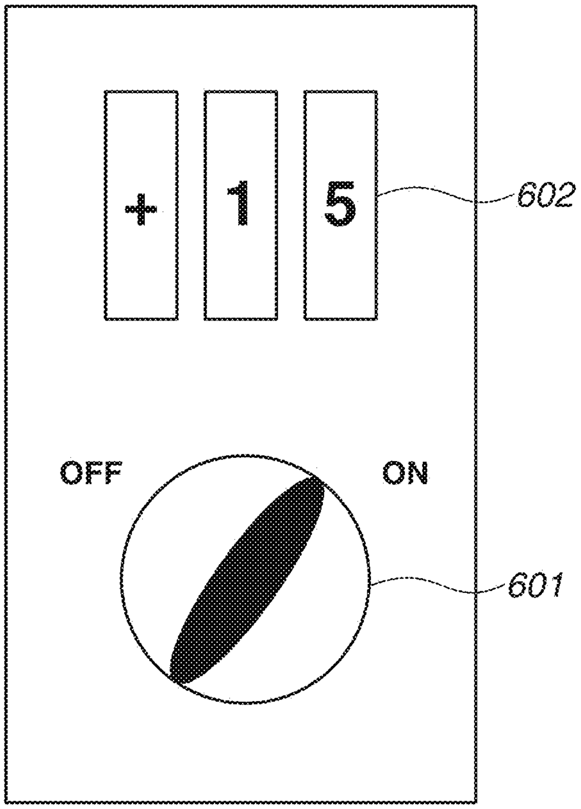
FIG. 6 is a diagram illustrating an example of a configuration of an operation unit included in the static elimination apparatus according to the present exemplary embodiment.

An operation unit 502 of the static elimination apparatus 200-3*a* has a configuration as illustrated in FIG. 6.

FIG. 6 is a diagram illustrating an example of the configuration of the operation unit 502 included in the static elimination apparatus 200-3*a*.

The user can make settings for the static elimination apparatus 200-3*a* through the operation unit 502. A mode setting switch 601 in FIG. 6 is used to switch whether to perform static elimination by the static elimination apparatus 200-3*a* (on or off). Only when the switch 601 is on, the control unit 501 performs control to execute a static elimination process using a static elimination processing unit 503. An adjustment dial 602 composed of a thumb rotary switch is used to regulate the intensity of the static elimination control to be performed when the mode setting switch 601 is on. The control unit 501 controls the adjustment dial 602 to be enabled only when the mode setting switch 601 is on.

A static elimination processing unit 503 is a portion that performs a static elimination process on a sheet conveyed to the portion. The static elimination processing unit 503 includes a static elimination roller unit 800 (which is an example of a static elimination unit), an ionizer 323, and a voltage application controller 321 for each of the static elimination roller unit 800 and the ionizer 323, which are illustrated in FIG. 3. The control unit 501 achieves control for applying voltages to the static elimination roller unit 800 and the ionizer 323 via the voltage application controller 321.

A ROM 504 stores a boot program for the static elimination apparatus 200-3*a*, a control program for the operation unit 502, and a static elimination processing program for the static elimination processing unit 503. Then, the control unit 501 appropriately loads a required program from the ROM 504 into a RAM 505 and executes the program.

Figure 7:
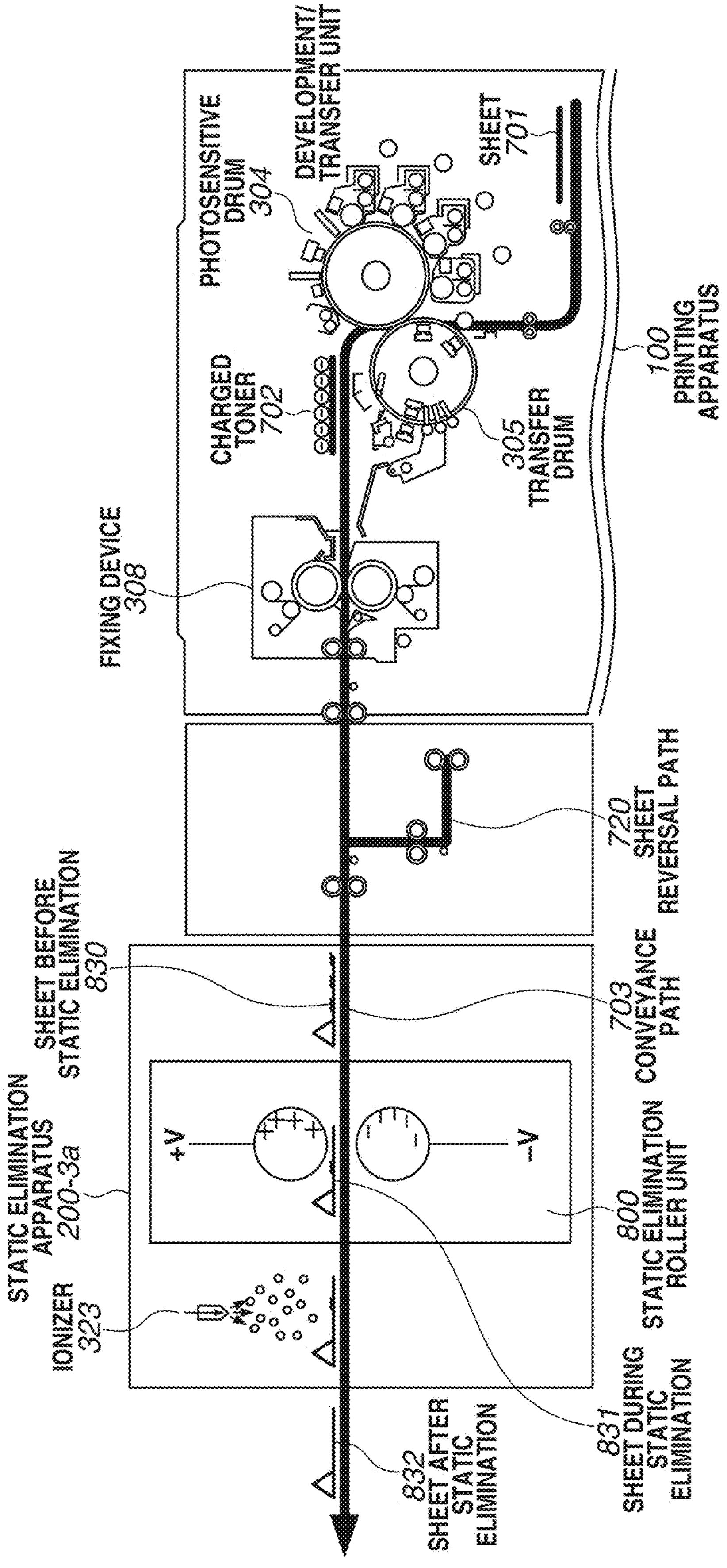
FIG. 7 is a diagram schematically illustrating a state where a static elimination process is performed by the static elimination apparatus according to the present exemplary embodiment.

With reference to FIG. 7, the outline of the static elimination process performed by the static elimination processing unit 503 is described. The details of the static elimination roller unit 800 will be described with reference to FIGS. 8 and 9.

FIG. 7 is a diagram schematically illustrating the state where the static elimination apparatus 200-3*a* performs a static elimination process on a sheet subjected to a printing process by the printing apparatus 100.

First, a sheet (701 illustrated in FIG. 7) is conveyed to a development/transfer unit composed of the photosensitive drum 304 and the transfer drum 305 via a conveyance path 703, and toner is placed on the sheet 701. Charged toner 702 placed on the sheet 701 is negatively charged and is fixed to the sheet 701 when the sheet 701 passes through the fixing device 308. The sheet (830 illustrated in FIG. 7) after the toner 702 is fixed through the fixing device 308 is conveyed to the static elimination apparatus 200-3*a* in the state where a face-up (UP) side of a printing surface of the sheet 830 is negatively charged. In the example illustrated in FIG. 7, the sheet processing apparatus 200 including a sheet reversal path 720 is included between the printing apparatus 100 and the static elimination apparatus 200-3*a*. The sheet processing apparatus 200 can perform a reversal process on the sheet after the toner is fixed and then convey the sheet to the static elimination apparatus 200-3*a*.

The static elimination apparatus 200-3*a* includes the static elimination roller unit 800 charged with the positive or negative polarity. The static elimination apparatus 200-3*a* applies charges having a polarity opposite to that of a sheet surface on each of the UP side and a face-down (FD) side to the charged sheet (830) by contact static elimination using rollers, thereby canceling out the charged state. It is, however, assumed that negative charges that are not removed or positive charges that are conversely charged in a static elimination process by the static elimination roller unit 800 remain on the sheet (831 illustrated in FIG. 7) after the sheet 831 passes through the static elimination rollers. Accordingly, the static elimination apparatus 200-3*a* according to the present exemplary embodiment further includes the ionizer 323 downstream of the static elimination roller unit 800.

The ionizer 323 is a device that generates a corona discharge by applying a voltage to an electrode needle included in the ionizer 323 and cancels out charging using ions generated by the corona discharge.

As described above, the static elimination roller unit 800 roughly eliminates static, and the ionizer 323 further adjusts residual charges, whereby the sheet (832 illustrated in FIG. 7) after the static elimination process discharged from the static elimination apparatus 200-3*a* is in the state where the charging of the sheet 832 is canceled out.

The static elimination apparatus 200-3*a* includes rollers (810 and 820 illustrated in FIGS. 8 and 9) that eliminate static in the static elimination roller unit 800. The sheet conveyed to the static elimination apparatus 200-3*a* is conveyed while being nipped by both rollers (810 and 820) and is subjected to the rough static elimination by the static elimination roller unit 800. Then, the ionizer 323 executes a static elimination process on residual charges while the sheet is conveyed to outside the apparatus by conveyance rollers 324 (FIG. 3). The details of the static elimination roller unit 800 will be described below.

Next, with reference to FIG. 3, the saddle stitch binding machine 200-3*b* is described.

Examples of sheet processing by the saddle stitch binding machine 200-3*b* include saddle stitch binding, a punching process, a cutting process, a shift sheet discharge process, a folding process, and a stapling process. These jobs are referred to as a "saddle stitch binding job".

In a case where the saddle stitch binding job is processed, first, the control unit 205 causes the saddle stitch binding machine 200-3*b* to convey a sheet for the job printed by the printing apparatus 100. Then, the control unit 205 causes the saddle stitch binding machine 200-3*b* to execute the sheet processing on the job. Further, the control unit 205 causes a sheet discharge destination Z of the saddle stitch binding machine 200-3*b* to hold a print product of the saddle stitch binding job subjected to the sheet processing by the saddle stitch binding machine 200-3*b*. There is a plurality of sheet discharge destination candidates for the sheet discharge destination Z. Since the saddle stitch binding machine 200-3*b* can execute a plurality of types of sheet processing, the sheet discharge destination candidates are used when the sheet discharge destination Z is divided according to the types of sheet processing. In the present exemplary embodiment, the detailed conveyance procedure of the saddle stitch binding job is not described.

Figure 8:
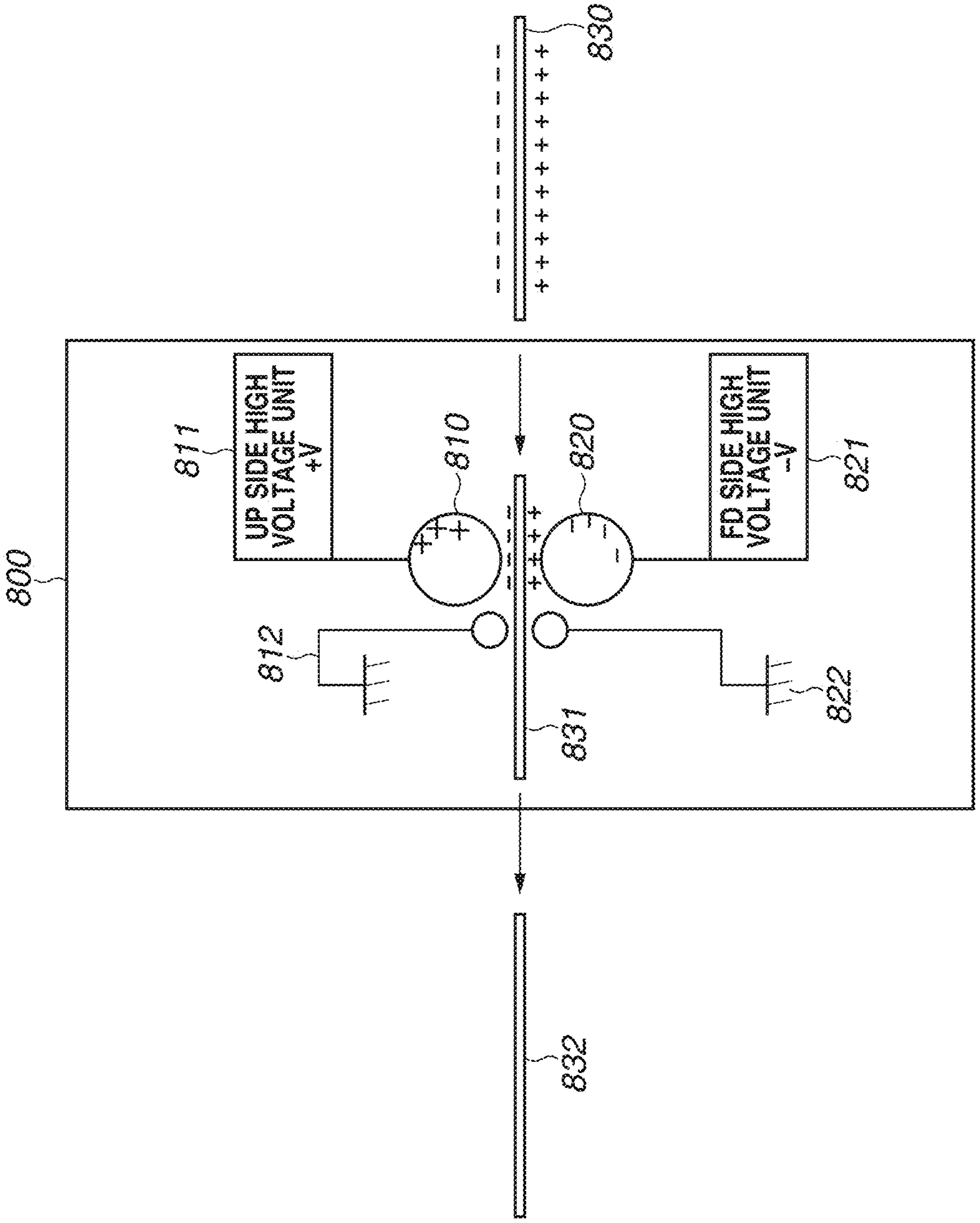
FIG. 8 is a diagram illustrating an example of a detailed configuration of a static elimination roller unit of the static elimination apparatus according to the present exemplary embodiment.
Figure 9:
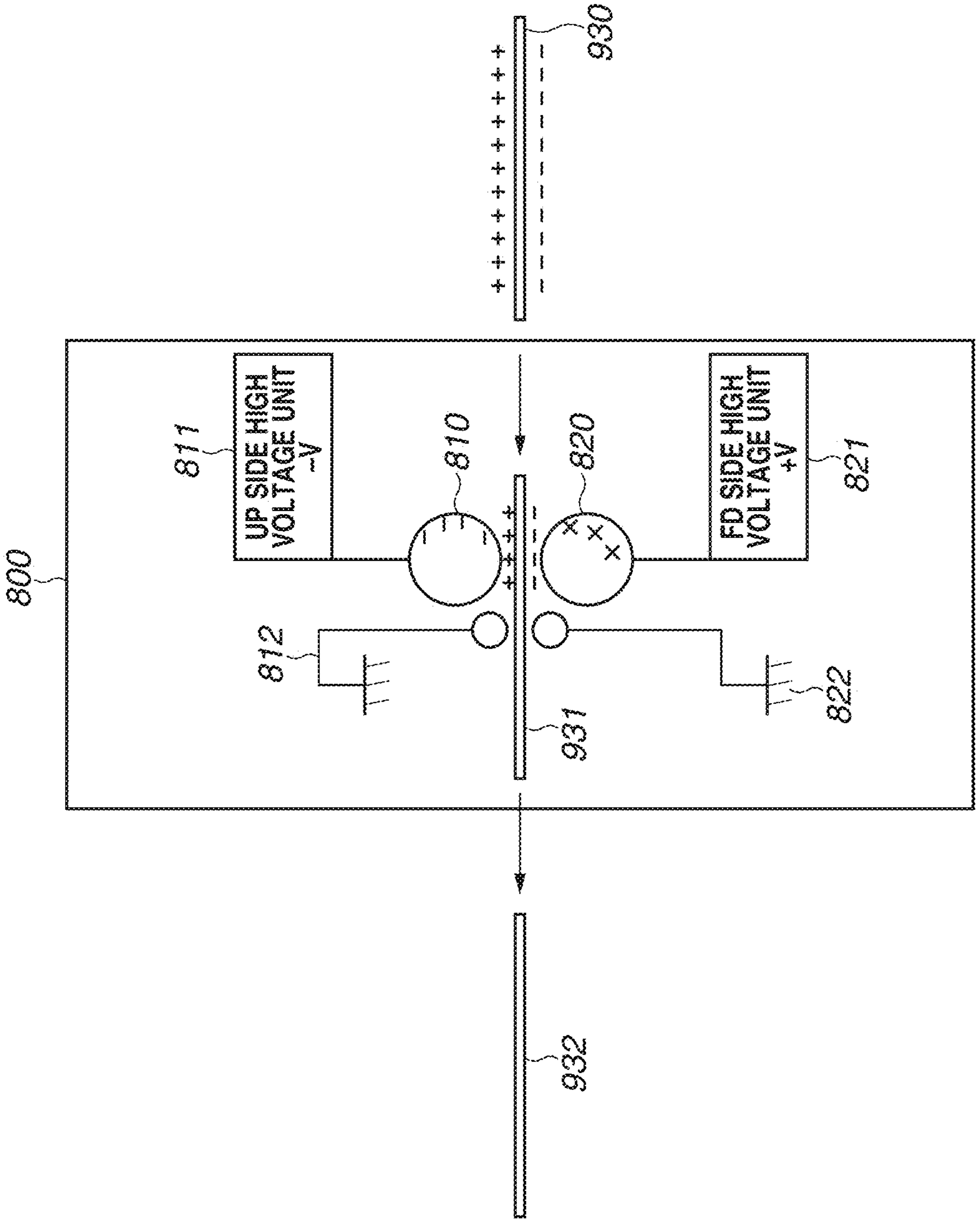
FIG. 9 is a diagram illustrating an example of the detailed configuration of the static elimination roller unit of the static elimination apparatus according to the present exemplary embodiment.

With reference to FIGS. 8 and 9, the detailed configuration of the static elimination roller unit 800 is described below.

FIGS. 8 and 9 are diagrams illustrating an example of the detailed configuration of the static elimination roller unit 800.

First, with reference to FIG. 8, a description is given of the configuration of the static elimination roller unit 800 and the operation state of the static elimination roller unit 800 in a case where an UP side of a sheet is negatively charged, and an FD side of the sheet is positively charged.

An UP side static elimination roller 810 is a static elimination roller that comes into contact with the UP side of the sheet. The UP side static elimination roller 810 is connected to an UP side high-voltage unit 811 that generates a static elimination voltage. The UP side static elimination roller 810 generates a voltage required for static elimination.

An UP side ground unit 812 is connected to the high-voltage unit 811 and the UP side static elimination roller 810 such that the UP side ground unit 812, the high-voltage unit 811, and the UP side static elimination roller 810 form a set. The potential difference between the high-voltage unit 811 and the ground unit 812 can generate a static elimination voltage in the UP side static elimination roller 810. In the example illustrated in FIG. 8, the UP side static elimination roller 810 is maintained at a positive voltage by a group of these units.

An FD side static elimination roller 820 is a static elimination roller that comes into contact with the FD side of the sheet. The FD side static elimination roller 820 is connected to an FD side high-voltage unit 821 that generates a static elimination voltage on the FD side, and an FD side ground unit 822. The potential difference between the high-voltage unit 821 and the ground unit 822 can generate a static elimination voltage in the FD side static elimination roller 820. In the example illustrated in FIG. 8, the FD side static elimination roller 820 is maintained at a negative voltage by a group of these units.

The UP side high-voltage unit 811 and the FD side high-voltage unit 821 are configured to reverse the polarities of voltages to be generated according to an instruction from the control unit 205. Consequently, it is possible to maintain the UP side static elimination roller 810 at a positive voltage and maintain the FD side static elimination roller 820 at a negative voltage as illustrated in FIG. 9.

The UP side static elimination roller 810 and the FD side static elimination roller 820 according to the present exemplary embodiment each have the ability to generate a voltage of up to 100 kV with the positive polarity or the negative polarity. Some embodiments, however, are not limited to this.

As illustrated in FIG. 7, the static elimination roller unit 800 is included in a housing of the static elimination apparatus 200-3*a* and performs a static elimination process on a sheet on which printing is performed by the printing apparatus 100 and which is conveyed on a sheet path. First, in a case illustrated in FIG. 8, a sheet 830 conveyed to the static elimination apparatus 200-3*a* is a sheet of which an UP side is negatively charged and an FD side is positively charged. For example, the case illustrated in FIG. 8 corresponds to a case where the sheet after toner is fixed is not subjected to the reversal process and is conveyed to the static elimination apparatus 200-3*a*. The sheet 830 is subjected to the static elimination process as a sheet 831 during the static elimination by the static elimination rollers 810 and 820 applying voltages having polarities opposite to those of charges to the sheet 831 from both the UP side and the FD side in the static elimination roller unit 800, and is discharged as a sheet 832 after the static elimination to outside the apparatus.

On the other hand, in a case illustrated in FIG. 9, a sheet 930 conveyed to the static elimination apparatus 200-3*a* is a sheet of which an UP side is positively charged and an FD side is negatively charged. For example, the case illustrated in FIG. 9 corresponds to a case where the sheet after toner is fixed is subjected to the reversal process in the sheet reversal path 720 and then is conveyed to the static elimination apparatus 200-3*a*. To distinguish the case in FIG. 9 from the case in FIG. 8, FIG. 9 illustrates the sheet conveyed to the static elimination apparatus 200-3*a* as the sheet 930, the sheet during the static elimination as a sheet 931, and the sheet after the static elimination as a sheet 932. In this case, the sheet 930 is subjected to the static elimination process as the sheet 931 during the static elimination by the static elimination rollers 810 and 820 applying voltages having polarities opposite to those of charges to the sheet 931 from both the UP side and the FD side in the static elimination roller unit 800. Then, the sheet 930 is discharged as the sheet 932 after the static elimination to outside the apparatus.

A static elimination process through a print operation according to the first exemplary embodiment is described in detail below.

Figure 10:
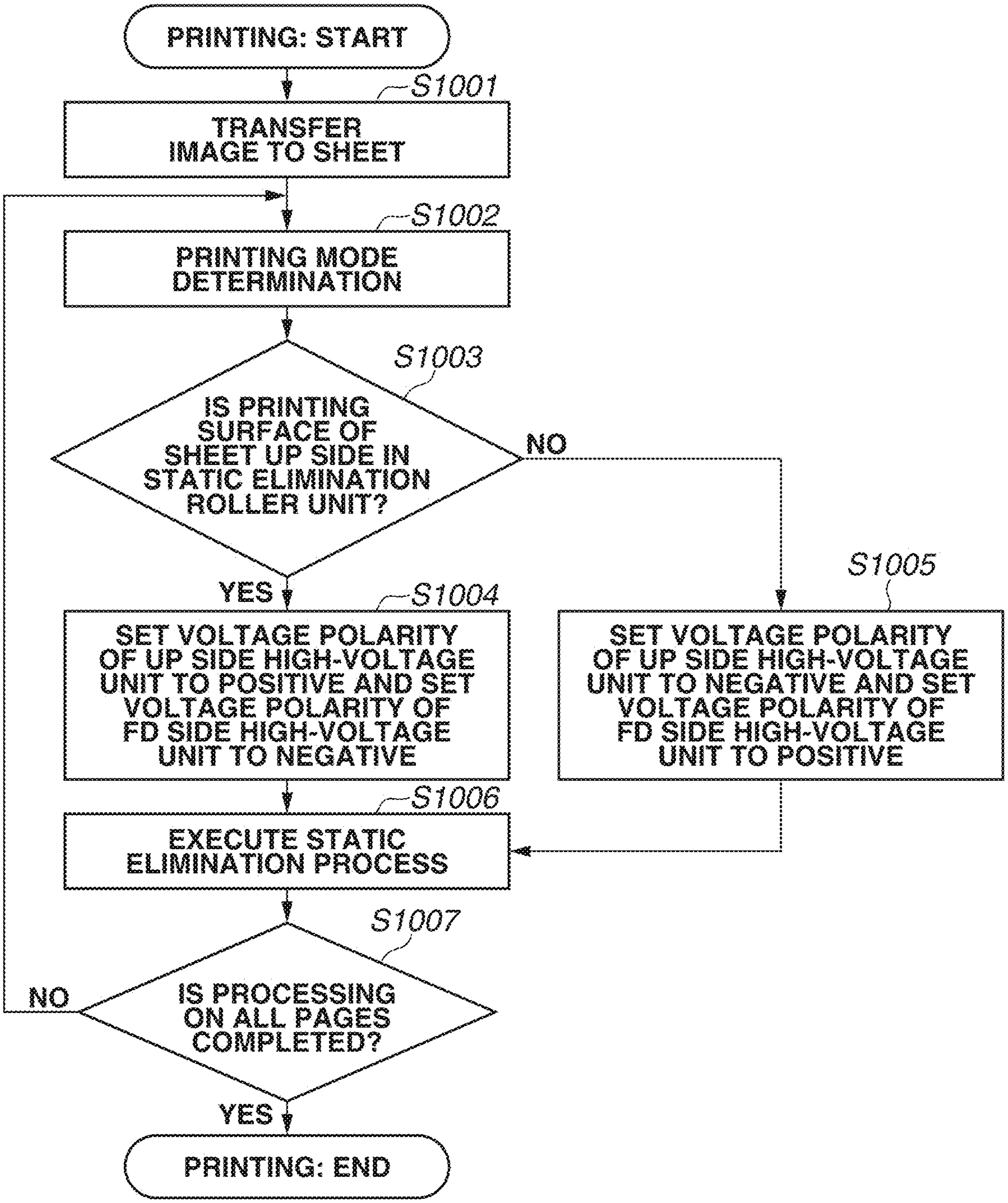
FIG. 10 is a flowchart illustrating an example of processing of a print job including a static elimination process according to a first exemplary embodiment.

FIG. 10 is a flowchart illustrating an example of the processing of a print job including the static elimination process according to the first exemplary embodiment. The processing of this flowchart is performed by the control unit 205 of the printing apparatus 100 loading control firmware stored in the ROM 207 into the RAM 208 and executing the control firmware.

The control unit 205 executes a print job to which print data is input through the operation unit 204 or the PC 102 by an operator. For example, the print data includes image data that is to be printed on a sheet, and also includes printing mode setting information indicating the sheet type, whether two-sided printing or one-sided printing, whether printing is performed on the sheet face up or face down, and whether the sheet is face up or face down at the time when the sheet is discharged. The printing mode setting information is not limited to this, and may need to include only information that allows the determination of whether a printing surface of the sheet at the time when the sheet passes through the static elimination roller unit 800 is an UP side or an FD side. In step S1001, the control unit 205 interprets the input print data, thereby generating page image data. The control unit 205 also instructs the printing apparatus 100 to feed a sheet on which printing is to be performed and form a page image, and transfers the page image to the sheet. In the case of two-sided printing, as described with reference to FIG. 3, the control unit 205 transfers page images to both sides (the first surface and the second surface) of the sheet.

Next, in step S1002, based on the printing mode setting information included in the print data, the control unit 205 determines whether a printing surface of the sheet to which the image is transferred in step S1001 is an UP side or an FD side at the time when the sheet passes through the static elimination roller unit 800 (a printing mode determination). In the case of two-sided printing, the control unit 205 determines whether a printing surface on which printing is performed last is the UP side or the FD side at the time when the sheet passes through the static elimination roller unit 800. The control unit 205 makes this determination taking into account whether the printing surface of the sheet to which the image is transferred in step S1001 is the UP side or the FD side at the time when toner is fixed by the fixing device 308 and whether the reversal process is performed in the sheet reversal path 720 after that. For example, if the printing surface of the sheet is the UP side at the time when toner is fixed by the fixing device 308 and the reversal process is not performed in the sheet reversal path 720, or if the printing surface of the sheet is the FD side at the time when toner is fixed by the fixing device 308 and the reversal process is performed in the sheet reversal path 720, it is determined that the printing surface of the sheet at the time when the sheet passes through the static elimination roller unit 800 is the UP side. On the other hand, if the printing surface of the sheet is the FD side at the time when toner is fixed by the fixing device 308 and the reversal process is not performed in the sheet reversal path 720, or if the printing surface of the sheet is the UP side at the time when toner is fixed by the fixing device 308 and the reversal process is performed in the sheet reversal path 720, it is determined that the printing surface of the sheet at the time when the sheet passes through the static elimination roller unit 800 is the FD side.

Next, in steps S1003 to S1006, based on the determination result of step S1002, the control unit 205 performs control of the static elimination process on the currently processed sheet.

If it is determined that the printing surface of the sheet at the time when the sheet passes through the static elimination roller unit 800 is the UP side (YES in step S1003), the control unit 205 determines that, as represented by the sheet 830 in FIG. 8, the UP side of the sheet is negatively charged by charged toner, and conversely, the FD side of the sheet is positively charged. In this case, the processing proceeds to step S1004.

In step S1004, the control unit 205 sets the voltage polarity of the UP side high-voltage unit 811 to positive and sets the voltage polarity of the FD side high-voltage unit 821 to negative. By this setting, the state of the static elimination roller unit 800 changes to a state as illustrated in FIG. 8. The UP side high-voltage unit 811 and the FD side high-voltage unit 821 are set to voltage outputs according to the setting of the operation unit 502 for setting a static elimination voltage as illustrated in FIG. 6. In the example of FIG. 6, the UP side high-voltage unit 811 and the FD side high-voltage unit 821 are set to voltage outputs of +15 kV and −15 kV, respectively. In this case, in step S1006, in the state where a static elimination voltage of +15 kV is applied to the UP side static elimination roller 810 and a static elimination voltage of −15 kV is applied to the FD side static elimination roller 820, the sheet passes through the static elimination roller unit 800 as represented by the sheet 831 in FIG. 8, and the static elimination process on the sheet is performed. Thus, a final product sheet in the state where charges are eliminated from the sheet, as represented by the sheet 832 in FIG. 8, is obtained.

If, on the other hand, it is determined that the printing surface of the sheet at the time when the sheet passes through the static elimination roller unit 800 is not the UP side (NO in step S1003), the control unit 205 determines that, as with the sheet 930 in FIG. 9, the FD side of the sheet is negatively charged by charged toner, and conversely, the UP side of the sheet is positively charged. In this case, the processing proceeds to step S1005.

In step S1005, the control unit 205 sets the voltage polarity of the UP side high-voltage unit 811 to negative and sets the voltage polarity of the FD side high-voltage unit 821 to positive. By this setting, the state of the static elimination roller unit 800 changes to a state as illustrated in FIG. 9. In this case, in step S1006, in the state where a static elimination voltage of −15 kV is applied to the UP side static elimination roller 810 and a static elimination voltage of +15 kV is applied to the FD side static elimination roller 820, the sheet passes through the static elimination roller unit 800 as represented by the sheet 931 in FIG. 9, and the static elimination process on the sheet is performed. Thus, a final product sheet in the state where charges are eliminated from the sheet, as represented by the sheet 932 in FIG. 9, is obtained.

Next, in step S1007, the control unit 205 determines whether the processing on all the pages of the print data is completed with the page transferred to the sheet in step S1001. If the print data includes a page that has not yet been processed besides the page transferred in step S1001 (NO in step S1007), the processing returns to step S1001. More specifically, the processes of steps S1001 to 1007 are repeated as long as the print data includes a page that has not yet been processed (a remaining page).

If, on the other hand, the processing on all the pages of the print data is completed with the page transferred in step S1001 (YES in step S1007), the processing of this flowchart (the processing of the print job including the static elimination process) ends.

As described above, in the first exemplary embodiment, static is eliminated from a sheet after a printing step by applying static elimination voltages having polarities opposite to the charge polarities of the sheet to the sheet from both an UP side and an FD side. Particularly, static is eliminated while switching the voltage characteristics of the UP side static elimination roller 810 and the FD side static elimination roller 820 according to whether a printing surface of a sheet when the sheet passes through the static elimination roller unit 800 is an UP side or an FD side. Consequently, it is possible to appropriately eliminate static from a sheet after printing. As a result, the sticking of sheets and the attachment of dust after a printing step do not occur, and it is possible to obtain a final product having a quality intended by a user.

Also, a configuration is also possible in which in the above configuration, only a method for eliminating static from a sheet by applying static elimination voltages having polarities opposite to the charge polarities of the sheet to the sheet from both an UP side and an FD side is employed, and the voltage characteristics of the UP side static elimination roller 810 and the FD side static elimination roller 820 are not switched. For example, this is a configuration in which when static is eliminated from a sheet, a positive voltage is always applied to an UP side of the sheet, and a negative voltage is always applied to an FD side of the sheet.

In this configuration, if a printing surface of the sheet when the sheet passes through the static elimination roller unit 800 is the UP side, it is possible to appropriately eliminate static from the sheet. In this configuration, however, if the UP side and the FD side of the sheet when the sheet passes through the static elimination roller unit 800 are reversed by reversing the sheet in a conveyance path for the purpose of a finishing process, it is not possible to appropriately eliminate static from the sheet. Further, there is also a possibility that the sheet is actually charged by applying static elimination voltages to the sheet from both the UP side and the FD side. Thus, there is a possibility that a final product having a quality intended by a user is not obtained because the sticking of sheets occurs due to the charging of the sheet and makes post-processing difficult, or the quality of a final product remarkably deteriorates due to the attachment of dust or paper dust. The present exemplary embodiment can even solve such an issue. Even in a case where the UP side and the FD side of the sheet when the sheet passes through the static elimination roller unit 800 are reversed, it is possible to appropriately eliminate static from the sheet after a printing step. As a result, the sticking of sheets and the attachment of dust after a printing step do not occur, and it is possible to obtain a final product having a quality intended by a user.

In a second exemplary embodiment, to prevent a sheet from being conversely charged by excessively applying static elimination voltages in the static elimination roller unit 800, control for turning on the minimum necessary static elimination roller is performed. In the second exemplary embodiment, although the hardware configuration of the printing system 1000 including the static elimination roller unit 800 is similar to that according to the first exemplary embodiment, a control method for controlling the static elimination roller unit 800 performed by the control unit 205 (a static elimination process through a print operation) is different from that according to the first exemplary embodiment. The differences from the first exemplary embodiment are described below.

The processing of a print job including a static elimination process according to the second exemplary embodiment is described in detail below.

Figure 11:
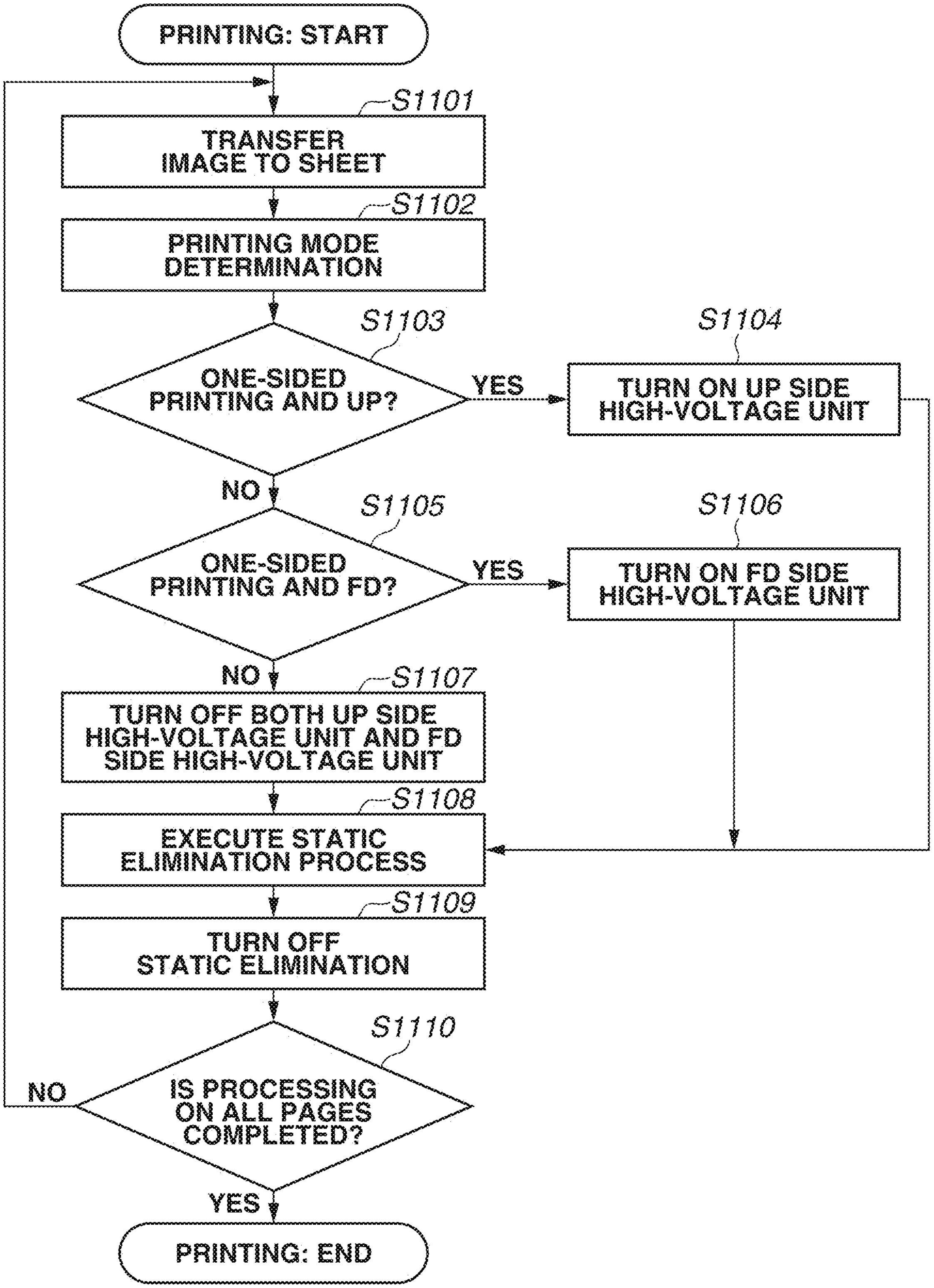
FIG. 11 is a flowchart illustrating an example of processing of a print job including a static elimination process according to a second exemplary embodiment.

FIG. 11 is a flowchart illustrating an example of the processing of a print job including the static elimination process according to the second exemplary embodiment. The processing of this flowchart is performed by the control unit 205 of the printing apparatus 100 loading control firmware stored in the ROM 207 into the RAM 208 and executing the control firmware.

In the static elimination roller unit 800 according to the second exemplary embodiment, in the initial state before a job starts, the UP side high-voltage unit 811 and the FD side high-voltage unit 821 are both in an off state. In other words, static elimination is off such that the voltages of the static elimination rollers 810 and 820 corresponding to the UP side high-voltage unit 811 and the FD side high-voltage unit 821 are also zero. The control unit 205 executes a print job to which print data is input through the operation unit 204 or the PC 102 by the operator.

For example, the print data includes image data that is to be printed on a sheet, and also includes printing mode setting information indicating the sheet type, whether two-sided printing or one-sided printing, whether printing is performed on the sheet face up or face down, and whether the sheet is face up or face down at the time when the sheet is discharged. The printing mode setting information is not limited to this, and may only need to include information that allows the determination of whether two-sided printing or one-sided printing is set, and whether a printing surface of the sheet at the time when the sheet passes through the static elimination roller unit 800 is an UP side or an FD side.

In step S1101, the control unit 205 interprets the input print data, thereby generating page image data. The control unit 205 also instructs the printing apparatus 100 to feed a sheet on which printing is to be performed and form a page image, and transfers the page image to the sheet. In the case of two-sided printing, as described with reference to FIG. 3, the control unit 205 transfers page images to both sides (the first surface and the second surface) of the sheet.

Next, in step S1102, based on the printing mode setting information, the control unit 205 determines whether one-sided printing or two-sided printing is set and whether a printing surface of the sheet to which the image is transferred (the second surface in the case of two-sided printing) is an UP side or an FD side at the time when the sheet passes through the static elimination roller unit 800 (a printing mode determination).

In the determination of whether the printing surface of the sheet to which the image is transferred is the UP side or the FD side, the control unit 205 makes the determination taking into account whether the printing surface of the sheet to which the image is transferred in step S1101 is the UP side or the FD side at the time when toner is fixed by the fixing device 308 and whether the reversal process is performed in the sheet reversal path 720 after that. For example, if the printing surface of the sheet is the UP side at the time when toner is fixed by the fixing device 308 and the reversal process is not performed in the sheet reversal path 720, or if the printing surface of the sheet is the FD side at the time when toner is fixed by the fixing device 308 and the reversal process is performed in the sheet reversal path 720, it is determined that the printing surface of the sheet at the time when the sheet passes through the static elimination roller unit 800 is the UP side. On the other hand, if the printing surface of the sheet is the FD side at the time when toner is fixed by the fixing device 308 and the reversal process is not performed in the sheet reversal path 720, or if the printing surface of the sheet is the UP side at the time when toner is fixed by the fixing device 308 and the reversal process is performed in the sheet reversal path 720, it is determined that the printing surface of the sheet at the time when the sheet passes through the static elimination roller unit 800 is the FD side.

Next, in steps S1103 to S1108, based on the determination result in step S1102, the control unit 205 performs control of the static elimination process on the currently processed sheet.

If it is determined that one-sided printing is set and the printing surface of the sheet at the time when the sheet passes through the static elimination roller unit 800 is the UP side (YES in step S1103), the processing proceeds to step S1104.

In step S1104, the control unit 205 turns on the UP side high-voltage unit 811 with the positive polarity and maintains the FD side high-voltage unit 821 in the off state (may turn on the FD side high-voltage unit 821 with the negative polarity according to the sheet type (in the case of a special sheet)). In this case, in step S1108, in the state where a static elimination voltage of +15 kV is applied to the UP side static elimination roller 810 and a static elimination voltage is not applied to the FD side static elimination roller 820, the print sheet 831 passes through the static elimination roller unit 800, and the static elimination process on the sheet is performed. Thus, the final product sheet 832 in the state where charges are eliminated from the sheet 831 is obtained.

If it is determined that one-sided printing is set and the printing surface of the sheet at the time when the sheet passes through the static elimination roller unit 800 is the FD side (NO in step S1103 and YES in step S1105), the processing proceeds to step S1106.

In step S1106, the control unit 205 turns on the FD side high-voltage unit 821 with the positive polarity and maintains the UP side high-voltage unit 811 in the off state (may turn on the UP side high-voltage unit 811 with the negative polarity according to the sheet type (in the case of a special sheet)). In this case, in step S1108, in the state where a static elimination voltage of +15 kV is applied to the FD side static elimination roller 820 and a static elimination voltage is not applied to the UP side static elimination roller 810, the print sheet 931 passes through the static elimination roller unit 800, and the static elimination process on the sheet is performed. Thus, the final product sheet 932 in the state where charges are eliminated from the sheet 931 is obtained.

If it is determined that two-sided printing is set (NO in step S1103 and NO in step S1105), the processing proceeds to step S1107.

In step S1107, the control unit 205 maintains both the FD side high-voltage unit 821 and the UP side high-voltage unit 811 in the off state. This is control for not performing the static elimination process on the sheet because in two-sided printing, charges on the UP side and the FD side of the sheet are canceled out by performing the process of fixing negatively charged toner to both sides of the sheet. This control is performed for the purpose of preventing an uncharged sheet from being conversely charged. In this case, in step S1108, in the state where a static elimination voltage is applied to neither the UP side static elimination roller 810 nor the FD side static elimination roller 820, the print sheet passes through the static elimination roller unit 800.

Next, in step S1109, the control unit 205 turns off the UP side high-voltage unit 811 and the FD side high-voltage unit 821, and the processing proceeds to step S1110.

Next, in step S1110, the control unit 205 determines whether the processing on all the pages of the print data is completed with the page transferred to the sheet in step S1101. If the print data includes a page that has not yet been processed besides the page transferred in step S1101 (NO in step S1110), the processing returns to step S1101. More specifically, the processes of step S1101 to 1110 are repeated as long as the print data includes a page that has not yet been processed (a remaining page).

If, on the other hand, the processing on all the pages of the print data is completed with the page transferred in step S1101 (YES in step S1110), the processing of this flowchart (the processing of the print job including the static elimination process) ends.

As described above, in the second exemplary embodiment, when the static elimination process is performed, control for turning on only the minimum necessary static elimination roller is performed. Consequently, it is possible to prevent a sheet from being conversely charged by excessively applying static elimination voltages in the static elimination roller unit 800. As a result, it is possible to appropriately eliminate static from a sheet after a printing step. Then, the sticking of sheets and the attachment of dust after a printing step do not occur, and it is possible to obtain a final product having a quality intended by a user.

In a third exemplary embodiment, according to the sheet type included in the printing mode setting information, the control unit 205 may switch the static elimination process control illustrated in FIG. 10 (first static elimination process control) and the static elimination process control illustrated in FIG. 11 (second static elimination process control). For example, if the sheet type is a special sheet (a sheet using a synthetic resin (a plastic) such as thick paper, synthetic paper, or coated paper), the control unit 205 may perform the first static elimination process control. If the sheet type is other than the special sheet, the control unit 205 may perform the second static elimination process control.

Also, the printing mode setting information may include setting information indicating whether to perform the first static elimination process control or perform the second static elimination process control. Yet also, a configuration may be employed in which a setting indicating whether to perform the first static elimination process control or perform the second static elimination process control may be made in the printing apparatus 100 through the operation unit 204 of the printing apparatus 100 or the PC 102. According to these settings, the control unit 205 switches the first static elimination process control and the second static elimination process control.

Also, the control unit 501 of the static elimination apparatus **200-3*a* may receive information such as the printing mode setting information from the control unit 205 of the printing apparatus 100 and perform the control in steps S1002 to S1006 in FIG. 10 or steps S1102 to S1109 in FIG. 11. Yet also, the control unit 501 of the static elimination apparatus 200-3*a* may receive the determination result in step S1002 in FIG. 10 or step S1102 in FIG. 11 from the control unit 205 of the printing apparatus 100 and perform the control in steps S1003 to S1006 in FIG. 10 or steps S1103 to S1109 in FIG. 11**.

As described above, according to the exemplary embodiments, it is possible to appropriately eliminate static from a sheet after a printing step. As a result, it is possible to prevent the sticking of sheets and the attachment of dust after a printing step, and it is possible to obtain a final product having a quality intended by a user.

The configurations and the contents of the above various pieces of data are not limited to these, and the various pieces of data may include a variety of configurations and contents according to the use or the purpose.

While the exemplary embodiments have been described above, the present disclosure can employ an embodiment as, for example, a system, an apparatus, a method, a program, or a storage medium. Specifically, the present disclosure may be applied to a system including a plurality of devices, or may be applied to an apparatus composed of a single device.

All the configurations obtained by combining the above exemplary embodiments are also included in the present disclosure.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2024-007323, which was filed on Jan. 22, 2024 and which is hereby incorporated by reference herein in its entirety.

What is claimed is:

1. A printing system comprising:

a printing apparatus configured to execute a printing process on a sheet; and a static elimination apparatus configured to perform a static elimination process on the sheet printed by the printing apparatus, wherein the static elimination apparatus includes a first static elimination unit provided on an upper surface side of the sheet printed by the printing apparatus, and a second static elimination unit provided on a lower surface side of the sheet, the static elimination apparatus being configured to switch a polarity of a voltage to be applied to the first static elimination unit to positive or negative and configured to switch a polarity of a voltage to be applied to the second static elimination unit to positive or negative, and wherein the static elimination apparatus includes a control unit configured to perform control to, depending on a printing surface of the sheet printed by the printing apparatus, switch the polarity of the voltage to be applied to the first static elimination unit to positive or negative and switch the polarity of the voltage to be applied to the second static elimination unit to positive or negative.

2. The printing system according to claim 1, wherein, in a case where the printing surface of the sheet is on a first static elimination unit side, the control unit performs control to set the polarity of the voltage to be applied to the first static elimination unit to positive and set the polarity of the voltage to be applied to the second static elimination unit to negative, and wherein, in a case where the printing surface of the sheet is on a second static elimination unit side, the control unit performs control to set the polarity of the voltage to be applied to the first static elimination unit to negative and set the polarity of the voltage to be applied to the second static elimination unit to positive.

3. The printing system according to claim 1, wherein the control unit performs the control based on setting information included in print data.

4. A printing system comprising:

a printing apparatus configured to execute a printing process on a sheet; and a static elimination apparatus configured to perform a static elimination process on the sheet printed by the printing apparatus, wherein the static elimination apparatus includes a first static elimination unit provided on an upper surface side of the sheet printed by the printing apparatus, and a second static elimination unit provided on a lower surface side of the sheet, the static elimination apparatus being configured to switch the first static elimination unit to on or off, and configured to switch the second static elimination unit to on or off, and wherein the static elimination apparatus includes a control unit configured to perform control to, depending on whether the sheet printed by the printing apparatus has been subjected to one-sided printing or two-sided printing and whether a surface of the sheet last printed is on a first static elimination unit side or a second static elimination unit side in a case where the sheet passes through the static elimination apparatus, switch the first static elimination unit to on or off and switch the second static elimination unit to on or off.

5. The printing system according to claim 4, wherein, in a case where the sheet printed by the printing apparatus has been subjected to one-sided printing and the surface of the sheet last printed is on the first static elimination unit side, the control unit performs control to set a polarity of a voltage to be applied to the first static elimination unit to positive and turn off a voltage to be applied to the second static elimination unit, wherein, in a case where the sheet printed by the printing apparatus has been subjected to one-sided printing and the surface of the sheet last printed is on the second static elimination unit side, the control unit performs control to set a polarity of the voltage to be applied to the second static elimination unit to positive and turn off the voltage to be applied to the first static elimination unit, and wherein, in a case where the sheet printed by the printing apparatus has been subjected to two-sided printing, the control unit performs control to turn off the voltage to be applied to the first static elimination unit and the voltage to be applied to the second static elimination unit.

6. A static elimination apparatus connected to a printing apparatus configured to execute a printing process on a sheet, the static elimination apparatus configured to perform a static elimination process on the sheet printed by the printing apparatus, the static elimination apparatus comprising:

a first static elimination unit provided on an upper surface side of the sheet printed by the printing apparatus, wherein a polarity of a voltage to be applied to the first static elimination unit is switched to positive or negative;

a second static elimination unit provided on a lower surface side of the sheet, wherein a polarity of a voltage to be applied to the second static elimination unit is switched to positive or negative; and a control unit configured to perform control to, depending on a printing surface of the sheet printed by the printing apparatus, switch the polarity of the voltage to be applied to the first static elimination unit to positive or negative and switch the polarity of the voltage to be applied to the second static elimination unit to positive or negative.

7. The static elimination apparatus according to claim 6, wherein, in a case where the printing surface of the sheet printed by the printing apparatus is on a first static elimination unit side, control is performed to set the polarity of the voltage to be applied to the first static elimination unit to positive and set the polarity of the voltage to be applied to the second static elimination unit to negative, and wherein, in a case where the printing surface of the sheet printed by the printing apparatus is on a second static elimination unit side, control is performed to set the polarity of the voltage to be applied to the first static elimination unit to negative and set the polarity of the voltage to be applied to the second static elimination unit to positive.

8. A method for controlling a printing system including a printing apparatus configured to execute a printing process on a sheet, and a static elimination apparatus configured to perform a static elimination process on the sheet printed by the printing apparatus, the method comprising:

switching, depending on a printing surface of the sheet printed by the printing apparatus, a polarity of a voltage to be applied to a first static elimination unit provided on an upper surface side of the sheet printed by the printing apparatus to positive or negative; and switching, depending on the printing surface of the sheet printed by the printing apparatus, a polarity of a voltage to be applied to a second static elimination unit provided on a lower surface side of the sheet printed by the printing apparatus to positive or negative.

9. A non-transitory computer-readable storage medium storing computer-executable instructions for causing a computer to execute a method for controlling a printing system including a printing apparatus configured to execute a printing process on a sheet, and a static elimination apparatus configured to perform a static elimination process on the sheet printed by the printing apparatus, the method comprising:

switching, depending on a printing surface of the sheet printed by the printing apparatus, a polarity of a voltage to be applied to a first static elimination unit provided on an upper surface side of the sheet printed by the printing apparatus to positive or negative; and switching, depending on the printing surface of the sheet printed by the printing apparatus, a polarity of a voltage to be applied to a second static elimination unit provided on a lower surface side of the sheet printed by the printing apparatus to positive or negative.

* * * * *